(12) United States Patent
Peng et al.

(10) Patent No.: US 8,063,409 B2
(45) Date of Patent: Nov. 22, 2011

(54) SYSTEMS, DEVICES AND METHODS OF BROADBAND LIGHT SOURCES WITH TUNABLE SPECTRUM

(75) Inventors: Song Peng, Pleasanton, CA (US); Ming Li, North York (CA)

(73) Assignee: PhotonEdge Inc., Pleasanton, CA (US)

( * ) Notice: Subject to any disclaimer, the term of this patent is extended or adjusted under 35 U.S.C. 154(b) by 282 days.

(21) Appl. No.: 12/354,550

(22) Filed: Jan. 15, 2009

(65) Prior Publication Data

US 2009/0267088 A1 Oct. 29, 2009

Related U.S. Application Data

(60) Provisional application No. 61/125,272, filed on Apr. 24, 2008.

(51) Int. Cl.
*H01L 33/00* (2010.01)
*H01L 27/14* (2006.01)

(52) U.S. Cl. .......................................... 257/98; 257/431
(58) Field of Classification Search .................... 257/98, 257/431–432, E31.003, E33.059
See application file for complete search history.

(56) References Cited

U.S. PATENT DOCUMENTS

| | | | |
|---|---|---|---|
| 5,920,418 A | 7/1999 | Shiono | |
| 6,654,336 B2 * | 11/2003 | Kadowaki et al. | 369/112.07 |
| 7,016,525 B2 | 3/2006 | Gladnick | |
| 7,133,584 B2 | 11/2006 | Dawes | |
| 7,329,886 B2 * | 2/2008 | Singer et al. | 250/493.1 |
| 7,746,545 B2 | 6/2010 | Okuno | |
| 7,796,319 B2 * | 9/2010 | MacKinnon et al. | 359/239 |
| 7,813,046 B2 | 10/2010 | Taverner | |
| 2009/0103088 A1 * | 4/2009 | Delmas et al. | 356/328 |

FOREIGN PATENT DOCUMENTS

| | | |
|---|---|---|
| JP | 3415403 | 6/2003 |
| JP | 3422077 B2 | 6/2003 |
| KR | 10-2007-0063120 A | 6/2007 |

OTHER PUBLICATIONS

International Search Report from the International Searching Authority mailed on Jul. 2, 2009.

* cited by examiner

*Primary Examiner* — Cuong Q Nguyen
(74) *Attorney, Agent, or Firm* — Peter Su; SNR Denton US LLP

(57) ABSTRACT

Broadband light source systems, devices, and methods with a tunable spectrum are described by multiplexing a plurality of light sources, such as LEDs, with thin-film filters or diffraction gratings. A plurality of light sources with different or same wavelengths are multiplexed together to construct a combined broadband light source. A diffraction grating diffracts light beams from the plurality of light sources to a slit-shaped aperture, depending on selected light sources, the relative positions of the light sources to the slit-shaped aperture, and the type of grating to produce a tunable spectrum.

40 Claims, 12 Drawing Sheets

SYSTEMS, DEVICES AND METHODS OF BROADBAND LIGHT SOURCES WITH TUNABLE SPECTRUM

RELATED APPLICATION DATA

This application claims the benefit of the filing date of, and incorporates by reference, the U.S. provisional patent application No. 61/125,272 entitled "Broadband Light Sources with Flexible Spectrum," filed on 24 Apr. 2008.

BACKGROUND OF THE INVENTION

1. Field of the Invention

The present invention relates generally to broadband light sources, and more particularly, to the creation of broadband light sources with tunable spectrum.

2. Description of Related Art

Broadband light sources are used in a wide variety of fields including optical applications, industrial applications, medical applications, life science applications and other applications. A broadband light source, such as a light-emitting diode (LED), emits a broad range of wavelengths at a wide frequency. The recent development of LEDs increasingly provides broader wavelength coverage and high brightness.

A conventional solution for transmitting a broadband light signal is to use multiple modulators. This prior design starts with a broadband light source. The broadband light source is separated into individual narrow bands. Each of the modulators then modulates a narrow band respectively, which then the collection of narrow bands are recombined to produce the output broadband light signal. One shortcoming of the prior solution is the costs associated with separating, modulating individual narrow band, and recombining the narrow bands into the broadband light signal.

Accordingly, it is desirable to provide broadband light source devices and methods that produce a tunable spectrum with light-emitting diodes and optics for operation with different applications.

SUMMARY OF THE INVENTION

The present invention is directed to broadband light source systems, devices and methods with tunable spectrum by multiplexing a plurality of light sources, such as LEDs, with thin-film filters or diffraction gratings. A plurality of light sources with different or same wavelengths are multiplexed together to construct a combined (or a composite) broadband light signal. A diffraction grating diffracts light beams from the plurality of light sources to a slit-shaped aperture. Wavelength selectivity by the diffraction grating to the slit-shaped aperture depends on several combinational factors, including the types of selected light sources, the relative positions of the light sources to the slit-shaped aperture, and the type of grating, thereby producing a tunable spectrum.

Embodiments of the broadband light source devices include wavelength selectivity options by spectral slicing of one or more wavelengths from the plurality of light sources to produce various types of tunable spectrums.

Embodiments of the broadband light source devices include a fiber bundle array where each of the light sources is respectively coupled to an individual fiber in the fiber bundle array.

Embodiments of the broadband light source devices include a compound fiber array with rows and columns of fibers that form a matrix of two-dimensional fibers. A set of fibers is bundled together in a circular shape for coupling to a plurality of light sources that supply a particular wavelength, thereby increasing the spectral resolution and/or light throughput.

In some embodiments, a broadband light source device with a tunable spectrum employs a concave diffraction grating that multiplexes a plurality of wavelengths in parallel. The plurality of light sources emits cone-shaped diverging rays having a plurality of wavelengths to a concave diffraction grating. The concave diffraction grating comprises one or more grooves etched to a surface to deflect and combine the plurality of wavelengths sent from the plurality of light sources to an output slit-shaped aperture. All, some, or none of the plurality of the wavelengths emitted from the plurality of light sources may be transmitted through to the output slit-shaped aperture, depending on the combinational factors including the types of light sources selected, the relative positioning for each of the plurality of light sources to the output slit-shaped aperture, the type of concave diffraction grating and the properties of the grooves on the concave diffraction grating.

In some embodiments, a tunable broadband light source device comprises a plurality of light sources, a transmission diffraction grating and a pair of lenses that multiplexes a plurality of wavelengths in parallel. A first lens collimates the diverging rays from a plurality of light sources to generate collimated light beams. A transmission diffraction grating diffracts and combines the plurality of light beams at an angle in substantially the same direction into combined light beams. The second lens focuses the combined light beams for transmission to the output slit-shaped aperture.

In some embodiments, a tunable broadband light source device comprises a plane diffraction grating, a lens, and a plurality of light sources. The lens receives cone-shaped diverging rays from the plurality of light sources and transmits the collimated beams to the plane diffraction grating. The plane diffraction grating combines the collimated beams and reflects composite light beams back to the lens, which transmits the composite light beams to the output slit-shaped aperture. Alternatively, the plane diffraction grating can be rotated slightly along the x-axis, which would cause the plurality of light sources to be spatially separated from the output slit-shaped aperture along the y-axis.

In some embodiments, a tunable broadband light source system comprises two grating-based devices and a dichroic beamsplitter. The beamsplitter combines the light beams from the two grating-based devices to produce a wider range of tunable spectrum. An optional computing device is attached to the plurality of light sources in the two grating-based devices for individual tuning of the intensity of each light source independently.

Broadly stated, a broadband light source with a tunable spectrum comprises a first light source for emitting a first light beam having a first wavelength; a second light source for emitting a second light beam having a second wavelength; an output slit-shaped aperture positioned apart from the first and second light sources, the first light source being spaced apart a first distance from the output slit-shaped aperture, the second light source being spaced apart a second distance from the output slit-shaped aperture; and a concave diffraction grating diffracting the first and second wavelengths and combining the first and second wavelengths in parallel at the slit-shaped output aperture to generate a tunable light beam.

Advantageously, an LED-based tunable broadband light source device provides a high-tuning speed, typically modulating in excess of tens of MHz.

The structures and methods regarding the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
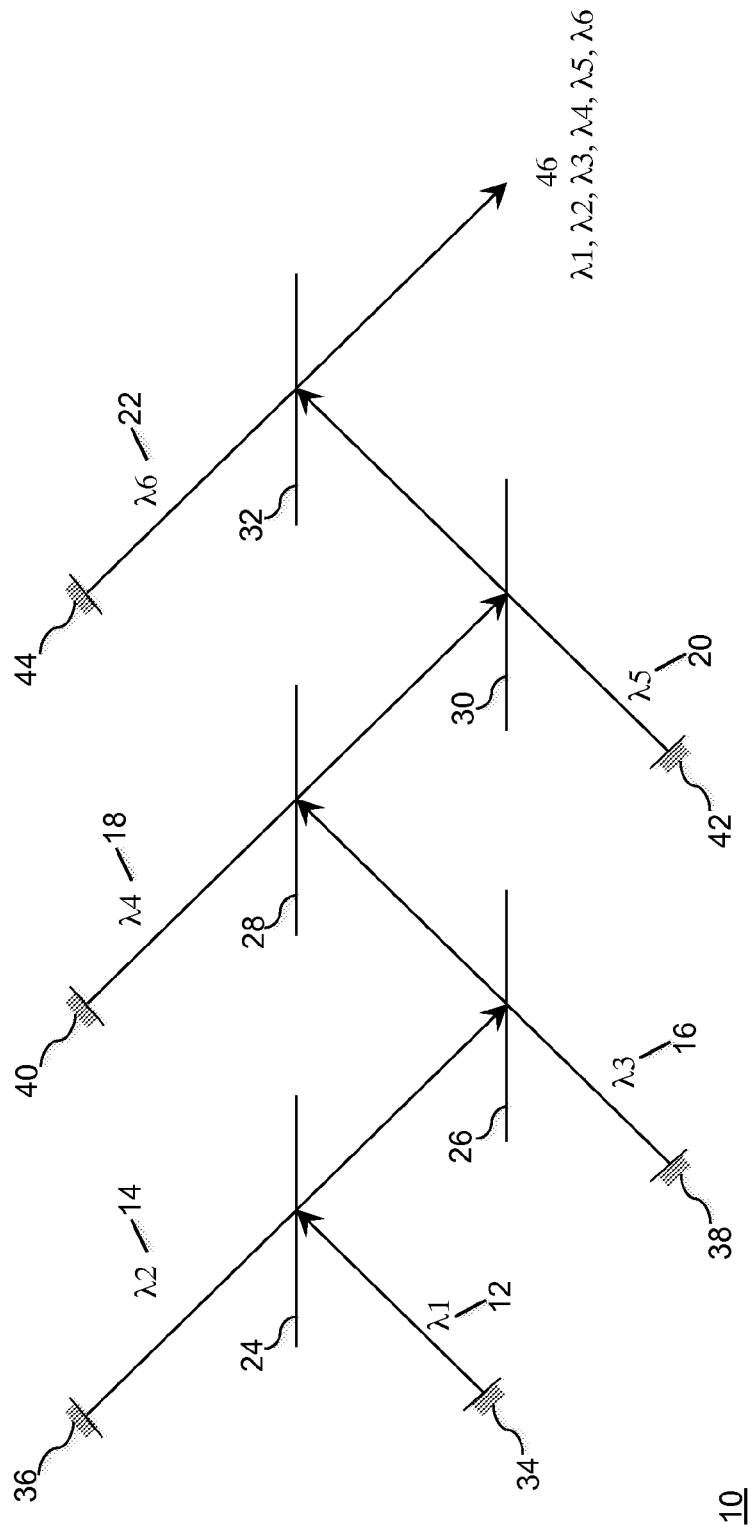
FIG. 1 illustrates a broadband light source device with tunable spectrum that multiplexes a plurality of light sources together with a plurality of filters in accordance with the present invention.

Referring now to FIG. 1, there is shown a pictorial diagram illustrating a broadband light source device 10 with tunable spectrum that multiplexes a plurality of light beams (or wavelengths) $\lambda_1$ 12, $\lambda_2$ 14, $\lambda_3$ 16, $\lambda_4$ 18, $\lambda_5$ 20, $\lambda_6$ 22 together with a plurality of filters 24, 26, 28, 30, 32. The plurality of light beams $\lambda_1$ 12, $\lambda_2$ 14, $\lambda_3$ 16, $\lambda_4$ 18, $\lambda_5$ 20, $\lambda_6$ 22 originate respectively from a plurality of light sources 34, 36, 38, 40, 42, 44. Embodiments of the plurality of light sources with different center wavelengths comprise light-emitting diodes or other similar components. A particular filter reflects light having a first wavelength and transmits light having a second wavelength, which are described more specifically below. The first filter f1 24 reflects light having the wavelength $\lambda_1$ 12 and transmits light having the wavelength $\lambda_2$ 14. The second filter f2 26 reflects light having the wavelengths $\lambda_1$ 12, $\lambda_2$ 14, and transmits light having the wavelength $\lambda_3$ 16. The third filter f3 28 reflects light having the wavelengths $\lambda_1$ 12, $\lambda_2$ 14, $\lambda_3$ 16, and transmits light having the wavelength $\lambda_4$ 18. The fourth filter f4 30 reflects light having the wavelengths $\lambda_1$ 12, $\lambda_2$ 14, $\lambda_3$ 16, $\lambda_4$ 18 and transmits light having the wavelength $\lambda_5$ 20. The fifth filter f5 32 reflects light having the wavelengths $\lambda_1$ 12, $\lambda_2$ 14, $\lambda_3$ 16, $\lambda_4$ 18, $\lambda_5$ 20 and transmits light having the wavelength $\lambda_6$ 22. The tunable light source device 10 generates an output 46 comprising all six wavelengths $\lambda_1$ 12, $\lambda_2$ 14, $\lambda_3$ 16, $\lambda_4$ 18, $\lambda_5$ 20, $\lambda_6$ 22. The alignment of filters allows multiplexing of light from the plurality of light sources 34, 36, 38, 40, 42, 44 with center wavelengths $\lambda_1$ through $\lambda_6$ into a composite light signal at the single output 46. Although this embodiment illustrates a relatively small number of light sources (LEDs), it is apparent to a person skilled in the art that a higher number of LEDs can be designed in the tunable broadband light source device, which may utilize a higher number of filters.

Figures 2A, 2B:
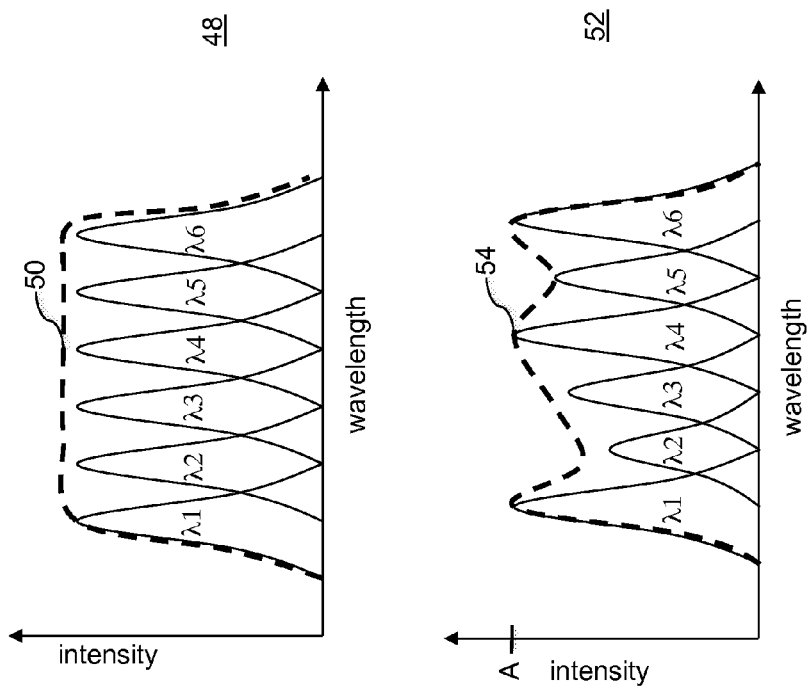
FIG. 2A illustrates a sample waveform generated from a broadband light source device showing a flat spectrum for a plurality of wavelengths in accordance with the present invention.
FIG. 2B illustrates a sample waveform generated from a tunable broadband light source device showing a tunable spectrum for a plurality of wavelengths having varying intensity levels in accordance with the present invention.

Various output spectra can be attained through program control. FIG. 2A illustrates a waveform 48 that shows a flat spectrum 50. Each of wavelengths $\lambda_1$ through $\lambda_6$ represents a narrow band of wavelength, rather than a discrete wavelength. The narrow band of wavelength covers a small range of wavelengths where the center of the narrow band is represented by wavelength $\lambda_1$ through $\lambda_6$, respectively. After processing through five filters 24, 26, 28, 30, 32 as described with respect to FIG. 1, the tunable broadband light source 10 generates an output comprising all six wavelength channels $\lambda_1, \lambda_2, \lambda_3, \lambda_4, \lambda_5$, and $\lambda_6$, thereby producing a flat top in the flat spectrum 50.

FIG. 2B illustrates a waveform 52 with a tunable spectrum intensity 54 by setting one or more LEDs at a lower intensity level. The tunable broadband light source device 10 is capable of tuning light beams individually to generate a spectrum of varying intensity by modulating $\lambda_1$ through $\lambda_6$ independently. In this illustration, the tunable broadband light source device 10 tunes a first wavelength $\lambda_1$ at amplitude A, tunes a second wavelength $\lambda_2$ at an intensity that is less than the amplitude A, tunes a third wavelength $\lambda_3$ at an intensity that is less than the amplitude A but greater than the amplitude of wavelength $\lambda_2$, tunes a fourth wavelength $\lambda_4$ at an intensity that is about the same as amplitude A of wavelength $\lambda_1$, tunes a fifth wavelength $\lambda_5$ at an intensity that is less than amplitude A but greater than the amplitude of wavelength $\lambda_3$, and tunes a sixth wavelength $\lambda_6$ at an intensity that is about the same as amplitude A of the first wavelength $\lambda_1$. The ability of the tunable broadband light source device 10 to tune each wavelength individually allows a user to produce a different shape of spectrum that is suitable to their designs. For example, one may like to block red colors, block green colors, but transmit blue colors. In another example, one may want to produce a specific percentage of intensity for each wavelength. A person skilled in the art should recognize that any varying spectrum can be obtained depending on the desired outcome of amplitude levels for various channels.

Figure 3:
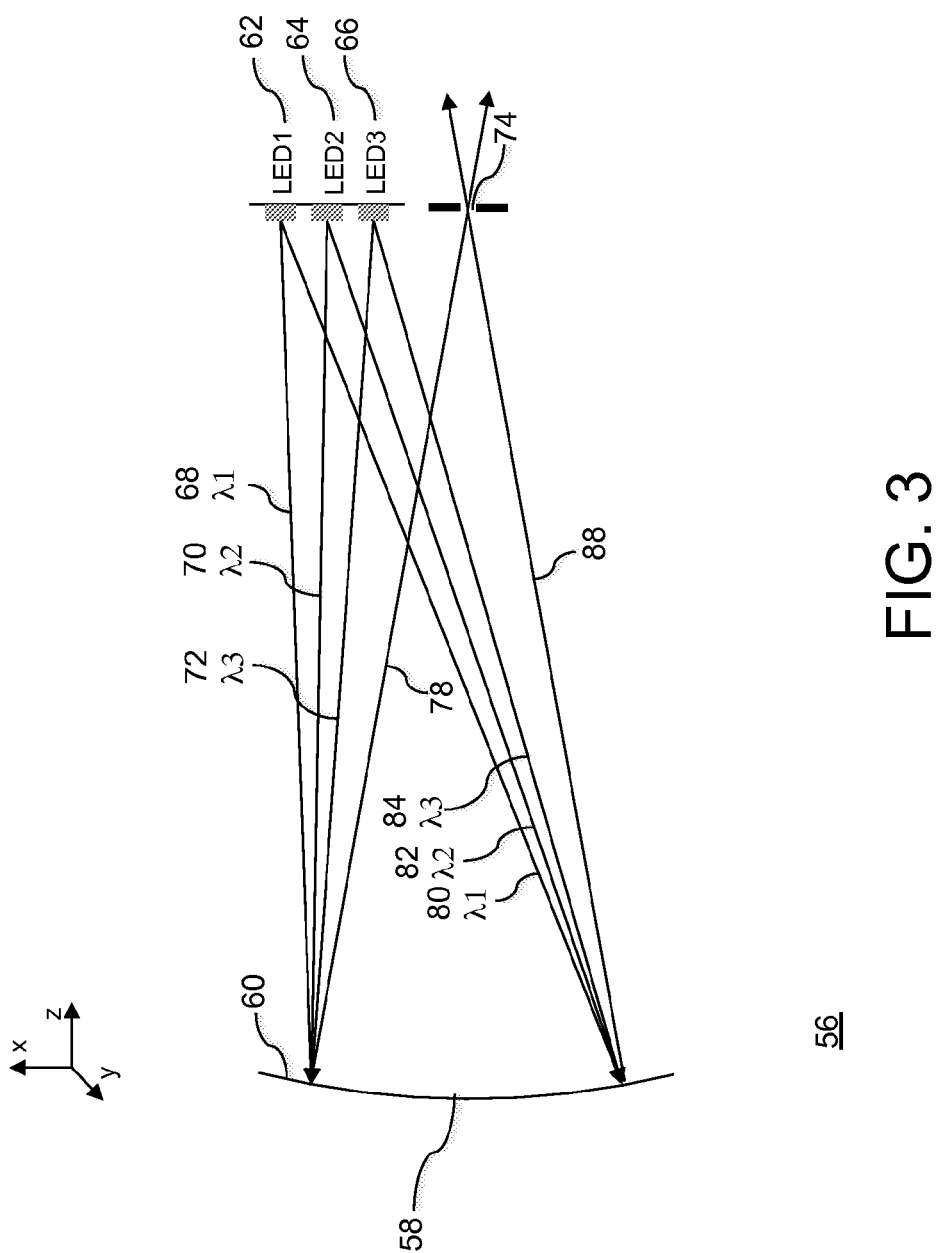
FIG. 3 illustrates a first embodiment of a tunable light source device employing a concave diffraction grating that multiplexes a plurality of wavelengths in parallel in accordance with the present invention.

FIG. 3 illustrates a first embodiment of a broadband light source device 56 with a tunable spectrum employing a concave diffraction grating 58 that multiplexes a plurality of wavelengths in parallel. In this embodiment, the concave diffraction grating 58 comprises typically tens of thousands of equally-spaced grooves etched to a surface 60 to diffract and combine light. The collection of grooves acts together to separate different wavelengths into different directions. The concave diffraction grating 58 allows parallel multiplexing of a plurality of wavelengths. Although three LEDs are illustrated in this embodiment, a higher number of LEDs in the tunable broadband light source device 56 can be practiced without departing from the spirit of the present invention. The positions of a first light source (LED1) 62, a second light source (LED2) 64, and a third light source (LED3) 66 are arranged so that the concave diffraction grating 58 combines wavelength $\lambda_1$ 68 from the first light source 62, wavelength $\lambda_2$ 70 from the second light source 64, and wavelength $\lambda_3$ 72 from the third light source 66 into a narrow image at an output slit-shaped aperture 74. The first light source 62, the second light source 64, and the third light source 66 can be implemented in many different ways, including bonding the three light sources (e.g. semiconductor chips) 62, 64, 66 together to a metal bar. The output slit-shaped aperture 74 comprises a gap for a light beam to pass through.

Embodiments of a concave diffraction grating include a reflective grating layer on a glass blank. The concave diffraction grating comprises a reflection surface that is concave, which has a spherical surface rules with variable line spacing and curved grooves that are the projection of equidistant and parallel lines on an imaginary plane surface. Concave diffraction gratings may be formed holographically with aberration correction measures. The resulted concave diffraction grating device has desirable slit image forming performance with respect to all the wavelengths in a UV, visible, or infrared region.

A relationship exists between the positioning of a light source relative to the diffraction grating and an output slit-shaped aperture, the wavelength of a light source, and the spatial period of grooves on a surface of the concave diffraction grating 60. As illustrated, the first light source 62 is positioned about 10 mm away from the slit-shaped aperture 74, and emits the first wavelength $\lambda_1$ 68 to the concave diffraction grating 58. The concave diffraction grating 58 diffracts (or reflects) the first wavelength $\lambda_1$ 68 through the output slit-shaped aperture 74. The second light source 64 is positioned about 9 mm away from the slit-shaped aperture 74 and emits the second wavelength $\lambda_2$ 70 to the concave diffraction grating 58. The concave diffraction grating 58 diffracts the second wavelength $\lambda_2$ 70 through the slit-shaped aperture 74. The third light source 66 is positioned about 8 mm away from the slit-shaped aperture 74 and emits the third wavelength $\lambda_3$ 72 to the concave diffraction grating 58. The concave diffraction grating 58 diffracts the third wavelength $\lambda_3$ 72 through the slit-shaped aperture 74. Effectively, the concave diffraction grating 58 diffracts and combines in parallel the first wavelength $\lambda_1$ 68, the second wavelength $\lambda_2$ 70, and the third wavelength $\lambda_3$ 72, and generates a composite light beam 78 at the output slit-shaped aperture 74.

Similarly, the first light source 62 is positioned a first distance, e.g. about 10 mm, away from the slit-shaped aperture 74, and emits a first wavelength $\lambda_1$ 80 to the concave diffraction grating 58. The concave diffraction grating 58 diffracts the first wavelength $\lambda_1$ 80 through the slit-shaped aperture 74. The second light source 64 is positioned a second distance, e.g. about 9 mm, away from the slit-shaped aperture 74 and emits a second wavelength $\lambda_2$ 82 to the concave diffraction grating 58. The concave diffraction grating 58 diffracts the second wavelength $\lambda_2$ 82 through the slit-shaped aperture 74. The third light source 66 is positioned a third distance, e.g. about 8 mm, away from the slit-shaped aperture 74 and emits a third wavelength $\lambda_3$ 84 to the concave diffraction grating 58. The concave diffraction grating 58 diffracts the third wavelength $\lambda_3$ 84 through the slit-shaped aperture 74. Effectively, the concave diffraction grating 58 diffracts and combines in parallel the first wavelength $\lambda_1$ 80, the second wavelength $\lambda_2$ 82, and the third wavelength $\lambda_3$ 84, and generates a composite light signal 88 (having the first wavelength $\lambda_1$ 80, the second wavelength $\lambda_2$ 82, and the third wavelength $\lambda_3$ 84) at the output slit-shaped aperture 74.

Figure 4:
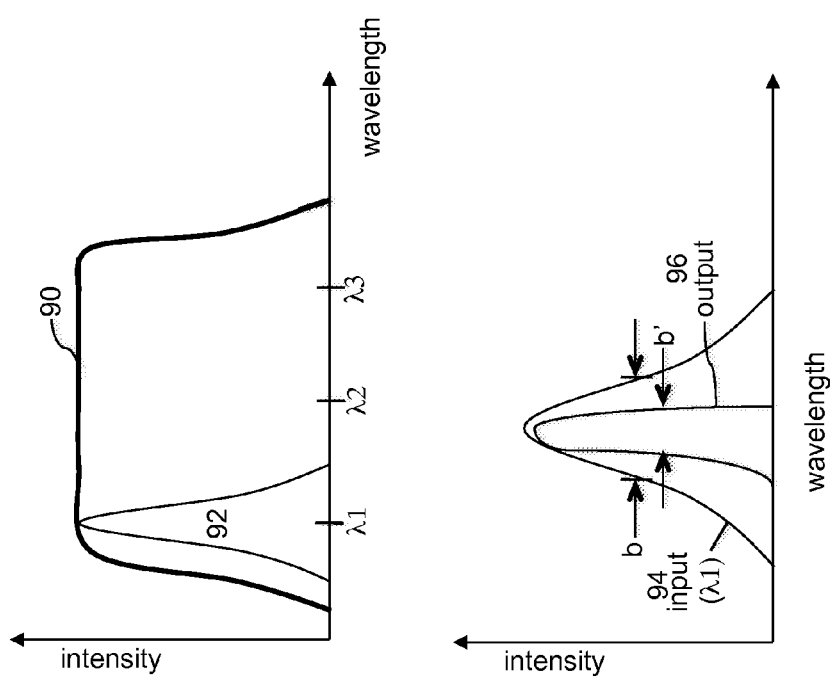
FIG. 4A illustrates a broadband waveform with the same light sources in which the broadband light source device serves as a spectral slicing device in parallel in accordance with the present invention.
FIG. 4B illustrates a waveform with a spectral resolution that is finer than the bandwidth of a light source in accordance with the present invention.

The concave diffraction grating 58 in the broadband light source device 56 provides a wide variety of wavelength selectivity options. Two sample waveforms are illustrated in FIGS. 4A and 4B to show alternative embodiments of the broadband light source device 56. FIG. 4A illustrates a broadband waveform 90 with the same LEDs in which the broadband light source device serves as a spectral slicing device. The same type of LEDs may be used to cover a plurality of wavelengths, like wavelengths $\lambda_1$, $\lambda_2$, $\lambda_3$, because LEDs typically have a significant spectral width (e.g., tens of nm for single-color LEDs to hundreds of nm for white LEDs). In such instance, the concave diffraction grating acts as a spectral slicing device which selects different wavelengths from each LED and combines them at the output slit. In this illustration, the concave diffraction grating passes through a narrow band of wavelength $\lambda_1$ 92 into the slit-shaped aperture 74 because LED1 62 is positioned at the first distance away from the slit-shaped aperture 74 that allows the concave diffraction grating 60 to pass the wavelength $\lambda_1$ into the slit-shaped aperture 74. However, because LED2 64 and LED3 66 are the same type of light source as LED1 68, the physical locations of LED2 64 and LED3 66 relative to the slit-shaped aperture 74 would cause the concave diffraction grating 60 to diffract wavelengths $\lambda_1$ from LED2 64 and LED3 66 to areas that would not pass through the slit-shaped aperture 74. For example, one may choose to use all white LEDs to cover almost an entire visible range. The broadband light source device 56 therefore provides the wavelength selection feature. In this illustration, the LED1 62 is placed at a position that is 10 nm away from the slit-shaped aperture 74 which allows the concave diffraction grating 58 to diffract the wavelength $\lambda_1$ to the slit-shaped aperture 74. Wavelengths other than $\lambda_1$ from the same LED1 62 would be diffracted to positions outside the slit-shape aperture 74, thus these wavelengths would be blocked by the aperture.

FIG. 4B illustrates a waveform with a spectral resolution that is finer than the bandwidth of an LED. The spectral resolution of the current disclosure is not limited by the bandwidths of the LEDs given the spectral slicing feature in the tunable broadband light source device. Rather, the spectral resolution can be finer or significantly finer than the bandwidth of LEDs, therefore providing much more flexibility in shaping the waveform of an output spectrum. As shown in FIG. 4B, the first light source 62 generates the first waveform with an input bandwidth b as shown 94. An output bandwidth b' is narrower than the input bandwidth of the input waveform $\lambda_1$ 94. For example, the input has an input channel bandwidth of about 50 nm that is broader than the output channel bandwidth which is about 10 nm. To characterize this in another way, the output channel bandwidth is about 10 nm, which has a narrower bandwidth than the bandwidth of the input channel bandwidth, which is about 50 nm. One suitable application of the spectral finer resolution is described with respect to FIG. 4B for a fluorescence excitation source that requires a finer (or higher) resolution than provided by the broadband light sources. Another suitable application is to slice a finer green channel from a broad green channel that is generated from the first light source 62.

Figure 5:
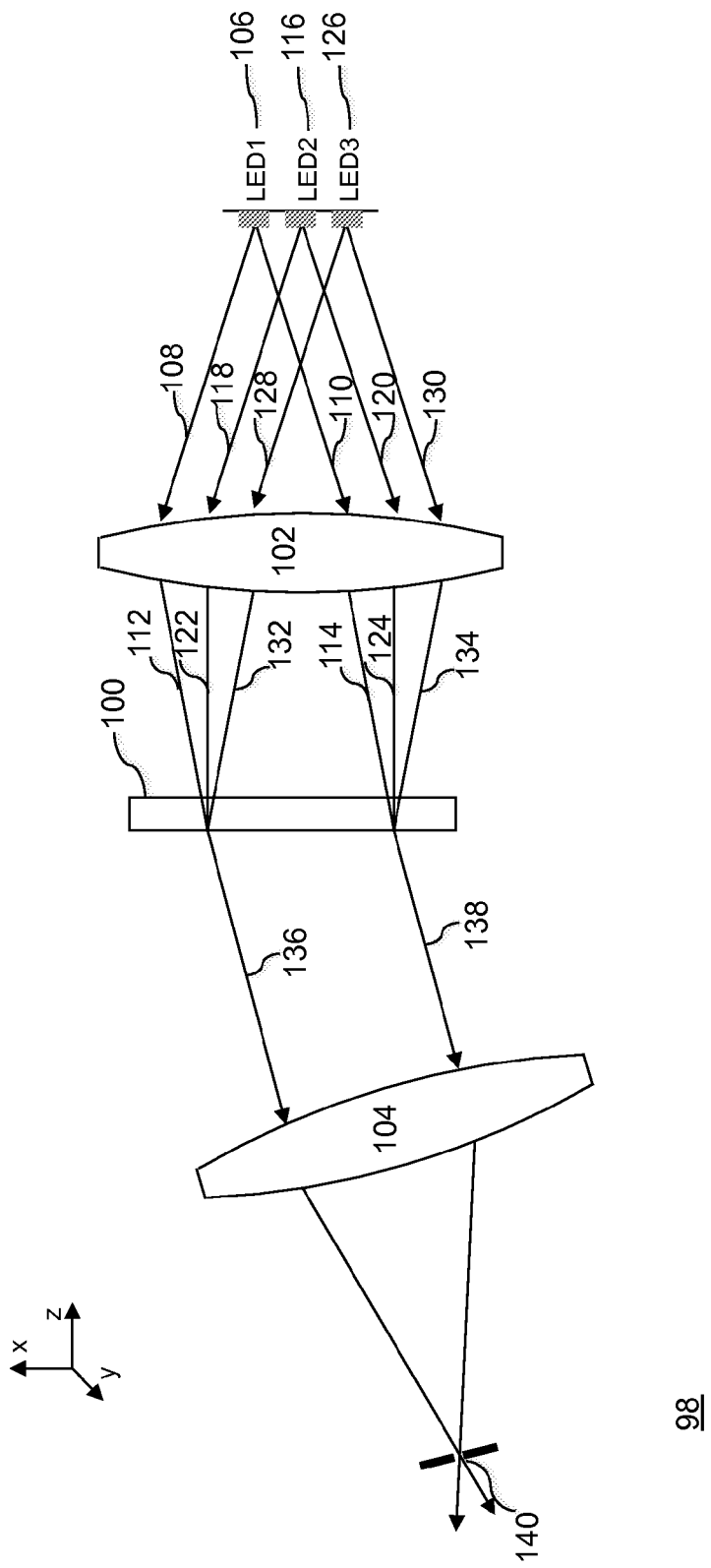
FIG. 5 illustrates a second embodiment of the tunable light source device employing a transmission diffraction grating and a pair of lenses that multiplexes a plurality of wavelengths in parallel in accordance with the present invention.

FIG. 5 illustrates a second embodiment of the tunable light source device 98 employing a transmission diffraction grating 100 and a pair of lenses 102, 104 that multiplexes a plurality of wavelengths in parallel. A first light source (LED1) 106 generates cone-shaped diverging rays 108, 110 to a first lens 102. The first lens 102 collimates the diverging rays 108, 110 to generate collimated rays (or parallel rays) 112, 114 to the transmission diffraction grating 100. A second light source (LED2) 116 generates cone-shaped diverging rays 118, 120 to the first lens 102. The first lens 102 collimates the diverging rays 118, 120 to generate collimated rays 122, 124 to the transmission diffraction grating 100. The first lens 102 collimates the diverging rays 118, 120 to generate collimated rays 122, 124 to the transmission diffraction grating 100. A third light source (LED3) 126 generates cone-shaped diverging rays 128, 130 to the first lens 102. The first lens 102 collimates the diverging rays 128, 130 to generate collimated rays 132, 134 to the transmission diffraction grating 100.

The positions of the first light source LED1 106, the second light source LED2 116, and the third light source LED3 126 are arranged so the transmission diffraction grating 100 diffracts and combines the first collimated light beam 112 (a first wavelength $\lambda_1$) from the first light source LED1 106, the second collimated light beam 122 (a second wavelength $\lambda_2$) from the second light source LED2 116, and the third collimated light beam 132 (a third wavelength $\lambda_3$) from the third light source LED3 126 at an angle in substantially the same direction (or substantially the same angle) into a combined light beam 136. Similarly, the positions of the first light source LED1 106, the second light source LED2 116, and the third light source LED3 126 are arranged so the transmission diffraction grating 100 combines and diffracts the first collimated light beam 114 (a first wavelength $\lambda_1$) from the first light source LED1 106, the second collimated light beam 124 (a second wavelength $\lambda_2$) from the second light source LED2 116, and the third collimated light beam 134 (a third wavelength $\lambda_3$) from the third light source LED3 126 at an angle in substantially the same direction (or substantially the same angle) into a combined light beam 138. The second lens 104 then focuses the combined (or composite) light beams 136, 138 into an output slit-shaped aperture 140. Embodiments of the first lens 102 and the second lens 104 comprise one or more lens element.

In this embodiment, the first lens 102 is arranged in a telecentric configuration to make the output light from each LED fully overlap with each other at the output. The first light source LED1 106, the second light source LED2 116, and the third light source LED3 126 are placed at the front focal plane of the first lens 102, while the transmission diffraction grating 100 is located at the back focal plane of the first lens 102. Each of the first lens 102 and the second lens 104 can be extended in length, either as a single piece or with additional lenses, for optimal performance as well as functioning with a larger number of light sources.

Figure 6A:
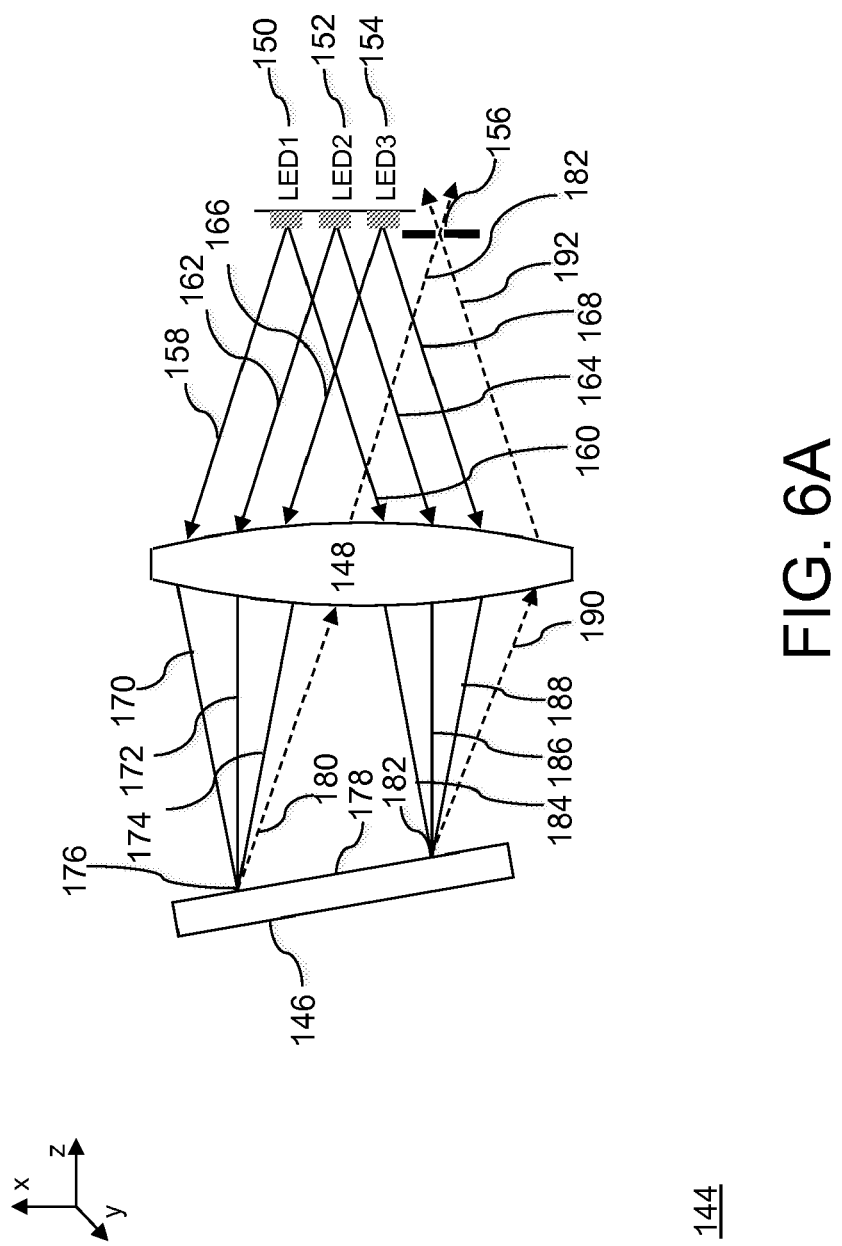
FIG. 6A illustrates a third embodiment in an X-Z view of a tunable broadband light source device employing a plane diffraction grating and a lens for multiplexing a plurality of wavelengths in parallel in accordance with the present invention.

FIG. 6A illustrates a third embodiment in an X-Z view of a tunable broadband light source device 144 employing a plane diffraction grating 146 and a lens 148. A first light source (LED1) 150 is positioned at a first distance away from a slit-shaped aperture 156. A second light source (LED2) 152 is positioned at a second distance away from the slit-shaped aperture 156. A third light source (LED3) 154 is positioned at a third distance away from the slit-shaped aperture 156. The first light source 150 emits cone-shaped light rays 158, 160 (first wavelengths $\lambda_1$) to the lens 148. The second light source 152 emits cone-shaped light rays 162, 164 (second wavelengths $\lambda_2$) to the lens 148. The third light source 154 emits cone-shaped light rays 166, 168 (third wavelengths $\lambda_3$) to the lens 148. The lens 148 receives the first wavelength $\lambda_1$ 158, the second wavelength $\lambda_2$ 162, and the third wavelength $\lambda_3$ 166, and transmits a light beam 170 containing the first wavelength $\lambda_1$, a light beam 172 containing the second wavelength $\lambda_2$, and the third light beam 174 containing the third wavelength $\lambda_3$ to the plane diffraction grating 146.

The plane diffraction grating 146 combines the wavelength $\lambda_1$ 170 originated from the first light source 150, the wavelength $\lambda_2$ 172 originated from the second light source 152, and a third wavelength $\lambda_3$ 174 originated from the third light source 154 into a single (combined, or composite) beam 180 and reflects the composite beam 180 back to the first lens 148. The lens 148 focuses and transmits the composite beam 182 into the slit-shaped aperture 156. The plane diffraction grating 146 combines the wavelength $\lambda_1$ 184 originated from the first light source 150, the wavelength $\lambda_2$ 186 originated from the second light source 152, and the third wavelength $\lambda_3$ 188 originated from the third light source 154 into a composite beam 190 and reflects the composite beam 190 back to the lens 148. The lens 148 focuses and transmits the composite beam 192 into the slit-shaped aperture 156.

Diffraction angle β of a plane grating can be calculated as $$\sin(\beta) = \sin(\alpha) + m\frac{\lambda}{\Lambda} \qquad \text{Eq. 1}$$

where α is the incident angle, m is the diffraction order, λ is wavelength, and Λ is the spatial period of grating grooves.

Lateral displacement d of the focal spot at the back focal plane of a lens is represented as $$d = f\tan(\theta) \qquad \text{Eq. 2}$$

where f is the focal length of the lens and θ is the angle between the incident beam and the optical axis of the lens.

Figure 6B:
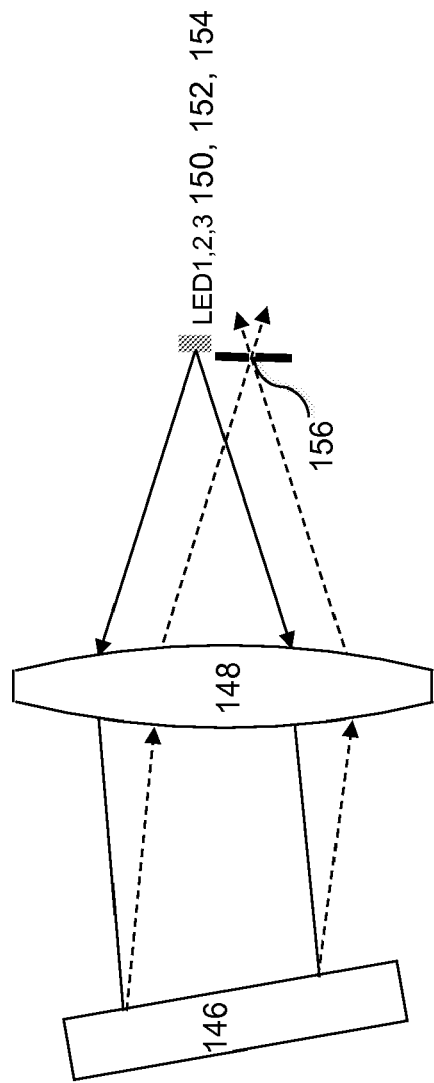
FIG. 6B illustrates the third embodiment in a Y-Z view of the tunable light source device employing a plane diffraction grating and a lens that multiplexes a plurality of wavelengths in parallel in accordance with the present invention.

FIG. 6B illustrates the third embodiment in a Y-Z view of the tunable broadband light source device 144 employing a plane diffraction grating 146 and a lens 148. By rotating the plane diffraction grating 146 slightly along the x-axis (or a first plane), the input LEDs 150, 152, 154 (also referred to as an LED array) can be spatially separated from the output slit-shaped aperture 156 along the y-axis (or a second plane). This feature allows a more efficient use of the field view of the lens because the LED array comprising light sources 150, 152, 154 and the output slit-shaped aperture 156 can overlap along the x-axis. This design also enables the plane diffraction grating 146 to be used in Littrow mount which typically yields the highest diffraction efficiency.

The spatial separation of the light sources (LEDs) and the output slit-shaped aperture is also applicable to other embodiments of the tunable broadband light source device, including the broadband light source device 56 of the first embodiment in FIG. 3, the broadband light source device 98 of the second embodiment in FIG. 5, and other embodiments, modifications or variations.

Figure 7:
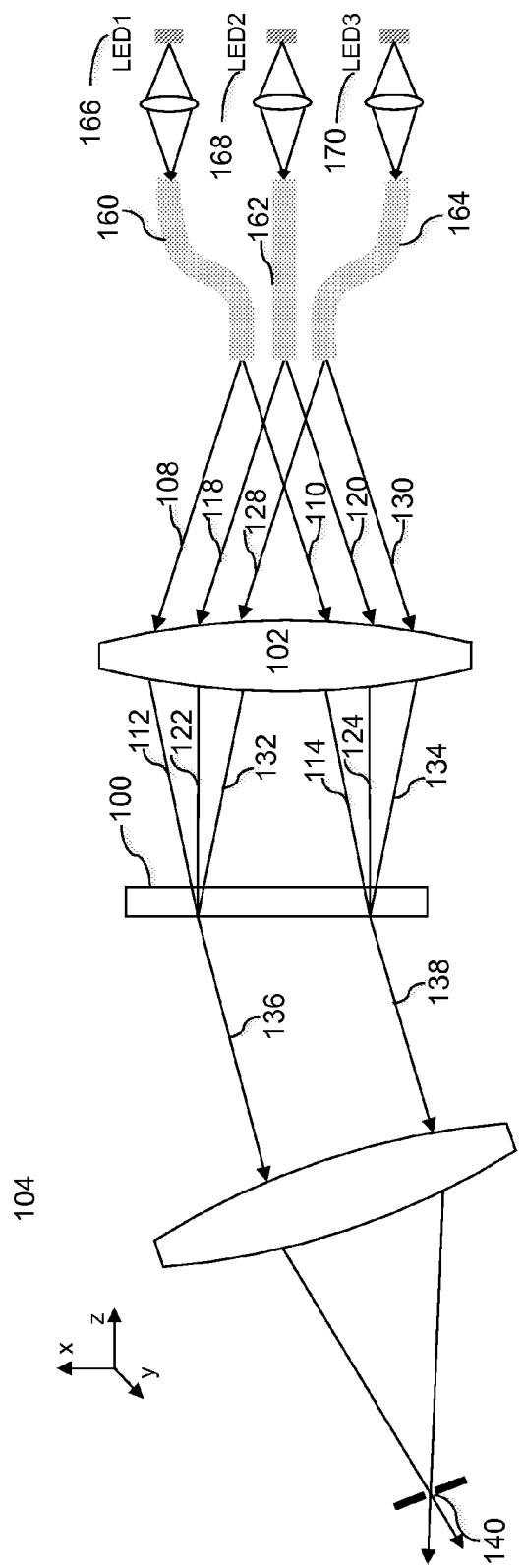
FIG. 7 illustrates a graphical diagram of a fourth embodiment of the tunable broadband light source device with an optical fiber array in accordance with the present invention.

FIG. 7 illustrates a graphical diagram of a fourth embodiment of the tunable broadband light source device 158 with an optical fiber array (or a fiber bundle array). In this embodiment, the LED array (i.e. light sources 106, 116, 126 in FIG. 5) in the second embodiment is replaced by a compound fiber array comprising fibers 160, 162, 164. Each of the light sources (LED1, LED2, LED3) 166, 168, 170 is coupled respectively to an individual fiber among fibers 160, 162, 164 through a coupling lens or by directly butting the fiber end to the emission area of a particular LED. Fiber arrays typically can be packed with high filling factor without much gap between adjacent fibers.

The use of optical fiber arrays in this embodiment is suitable for applications which are desirable to have continuous wavelength coverage without any gap. This requirement implies that the LEDs need to be packaged close together with minimum spacing in between. This can become practically difficult in terms of cost and yield. Also, the amount of heat dissipation may be insufficient. When LEDs are individually coupled into the fibers, they may be placed farther apart, making it easier to handle heat dissipation. Individual light source (LED) may also be replaced, and a new light source may be put in place to couple to the corresponding fiber.

The fiber array as illustrated in the fourth embodiment of FIG. 7 is also applicable to the first embodiment, the second embodiment, the third embodiment and other embodiments of a tunable broadband light source device.

The spectral or wavelength slicing as described above with respect to FIGS. 4A and 4B is also applicable to the tunable broadband light source device 158 with the optical fiber array as illustrated in FIG. 7.

Figure 8:
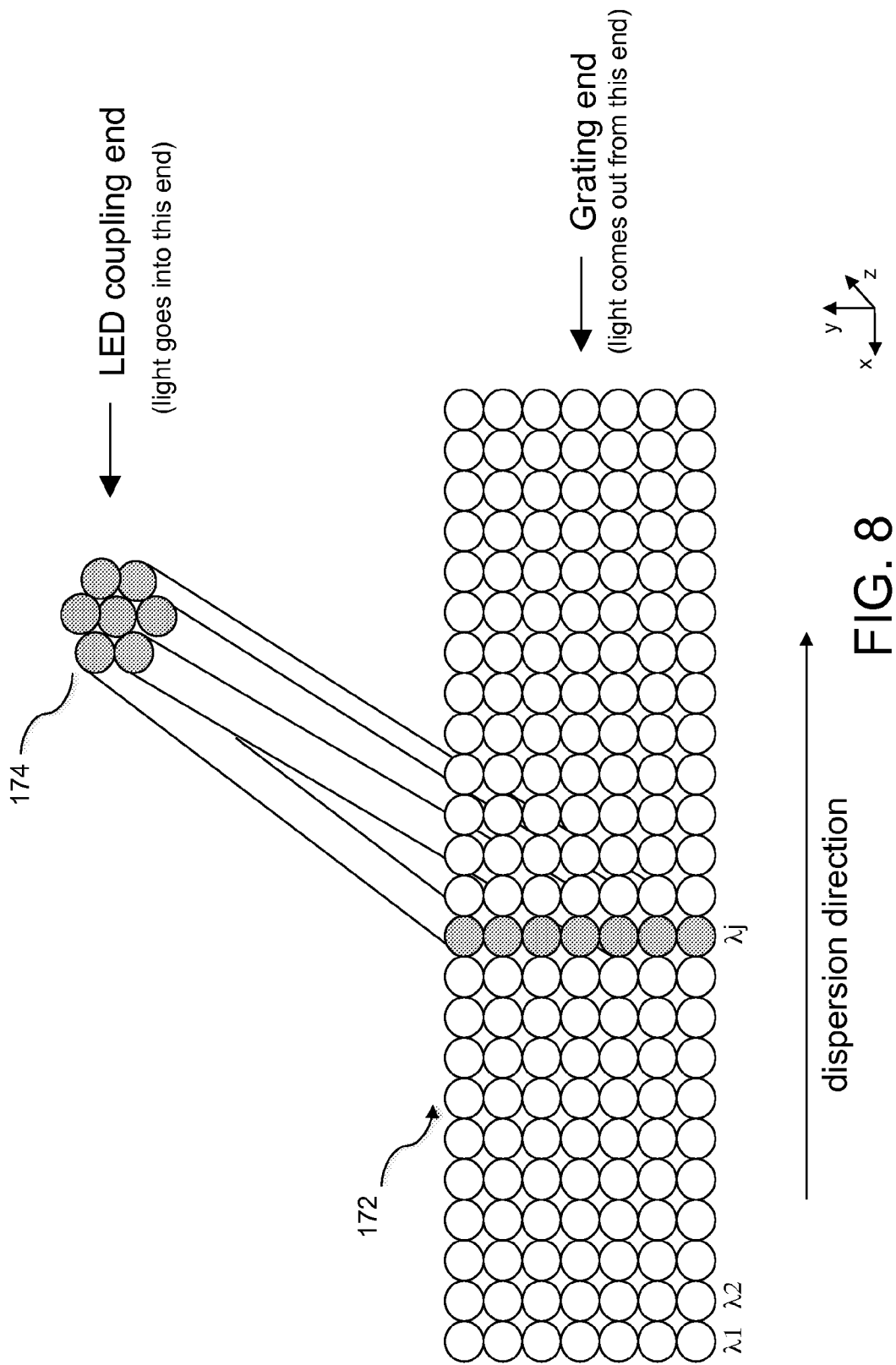
FIG. 8 illustrates a graphical diagram of a compound fiber array in a tunable broadband light source device for coupling between a plurality of light sources and a lens (or a grating) in accordance with the present invention.

FIG. 8 illustrates a graphical diagram of a compound fiber array 172 for coupling between a plurality of light sources (or LED coupling end), and a lens or a grating (or grating end) in a tunable broadband light source. The compound fiber array 172 comprises multiple rows of fibers, arranged in a matrix (or two dimensional) of fibers, rather than a single row of fibers. In this embodiment, each of the wavelengths $\lambda_1$, $\lambda_2 \ldots \lambda_j, \ldots$ is associated with an array of seven fibers. As shown in FIG. 8, the seven fibers associated with the wavelength $\lambda_j$ are bundled together in a circular (or round) shape of fibers (or a fiber bundle) 174. At the LED coupling end, all of the fibers for a channel are bundled together substantially to a circular shape to collect more light from a light source LED. The compound fiber array 172 is grouped in a round shape configuration as a technique to increase the spectral resolution and/or light throughput. Often a LED can emit a larger area than the cross-section of a single fiber. In this case, some light from the LED would not be coupled into the fiber. With a bundle of seven fibers as illustrated in this example, the cross-section of the fiber is effectively increased seven times. Therefore, significantly more light can be coupled into the system. As an alternative embodiment, multiple LEDs can be used and light from each LED is coupled into a single fiber (or a sub group of fibers). More specifically, rather than a first light source coupling to a single wavelength $\lambda_1$, there are seven light sources coupled to the seven fibers, and therefore supplying seven times of wavelength $\lambda_1$ to the slit-shaped aperture 140. Effectively, the result of grouping the seven fibers supplies seven times the amount of light (or wavelength $\lambda_1$) to the output slit-shaped aperture 140.

Due to a certain numerical aperture (NA) of a fiber, the light throughput is proportional to the cross-section of the fiber core. With a larger fiber core, light output is increased but spectral resolution is degraded. To address the counterbalance of the increased light output and degraded spectral resolution, the design of the compound fiber array 172 compensates for this effect. For each wavelength channel, multiple fibers are used to increase the cross-section so that more light can be collected.

The other end of the fiber array is placed at the front focal plane of the first lens (e.g., the first lens 102 in FIG. 5). The fibers for a particular wavelength channel are arranged into a vertical column, as shown in FIG. 8. This arrangement minimizes the width of the light emitting area thus maximize wavelength resolution. If the fiber core is relatively small, one may use multiple columns of fibers for a single wavelength channel.

At the output end of a system (or a tunable broadband light source device), instead of using a slit-shaped aperture, one can also use a fiber array to couple the light out of the system. In such instance, the cross-section of the output fiber array also has a rectangular shape, which matches the shape of the compound fiber array.

The compound fiber array 172 as illustrated in FIG. 8 is also applicable to all of the embodiments described in FIGS. 3, 5, 6A-6B, and 7.

Figure 9:
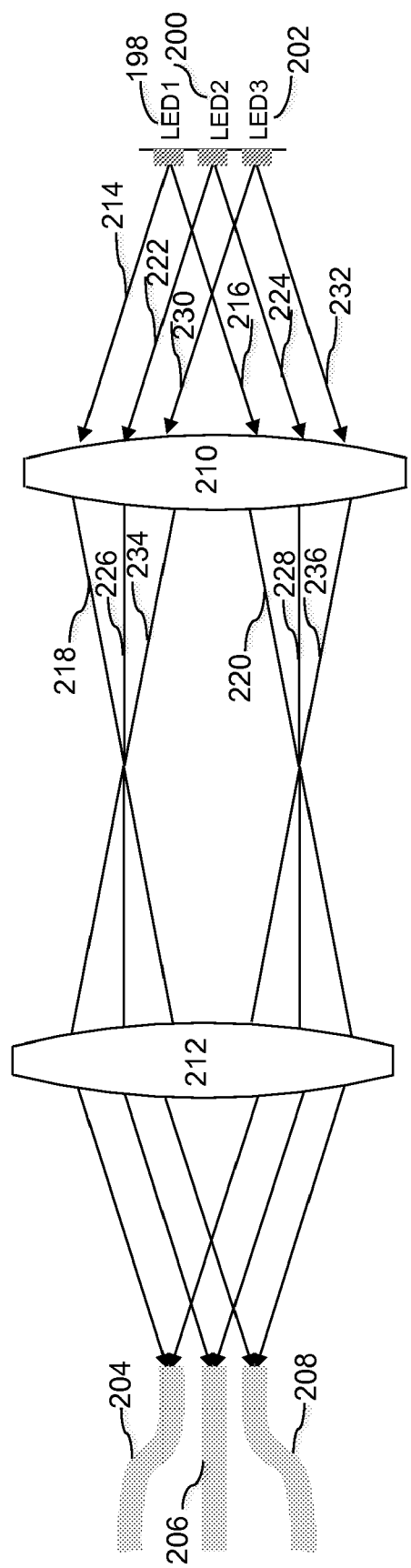
FIG. 9 illustrates a coupling system that couples a plurality of light sources to a fiber array with one set of optics in accordance with the present invention.

FIG. 9 illustrates a coupling system 196 that couples a plurality of LEDs 198, 200, 202 to multiple fibers 204, 206, 208 (collectively a fiber array) with one set of optics 210, 212. Other embodiments with fiber arrays in a system typically require coupling light from an LED to a fiber. It is more costly and time-consuming to couple one LED to one fiber individually. In the embodiment as illustrated in FIG. 9, the single set of optics 210, 212 is shared for multiple coupling between the plurality of LEDs 198, 200, 202 and the fiber array (i.e., a plurality of fibers 204, 206, 208).

Alternatively, the plurality of LEDs 198, 200, 202 and the corresponding fibers 204, 206, 208 can also be arranged in a two-dimensional array to further increase the number of LEDs and fibers. The compound fiber array depicted with respect to FIG. 8 may also be used in this configuration in order to improve the coupling efficiency.

The first light source LED1 198 emits cone-shaped diverging rays 214, 216 to the first lens 210. The first lens 210 collimates the diverging rays 214, 216 to generate collimated light beams 218, 220 to the second lens 212. The second lens 212 focuses the collimated light beams 218, 220 to the first fiber 208. The second light source LED2 200 emits cone-shaped diverging rays 222, 224 to the first lens 210. The first lens 210 collimates the diverging rays 222, 224 to generate collimated light beams 226, 228 to the second lens 212. The second lens 212 focuses the collimated light beams 226, 228 to the second fiber 206. The third light source LED3 202 emits cone-shaped diverging rays 230, 232 to the first lens 210. The first lens 210 collimates the diverging rays 230, 232 to generate collimated light beams 234, 236 to the second lens 212. The second lens 212 focuses the collimated light beams 234, 236 to the third fiber 204.

Figure 10:
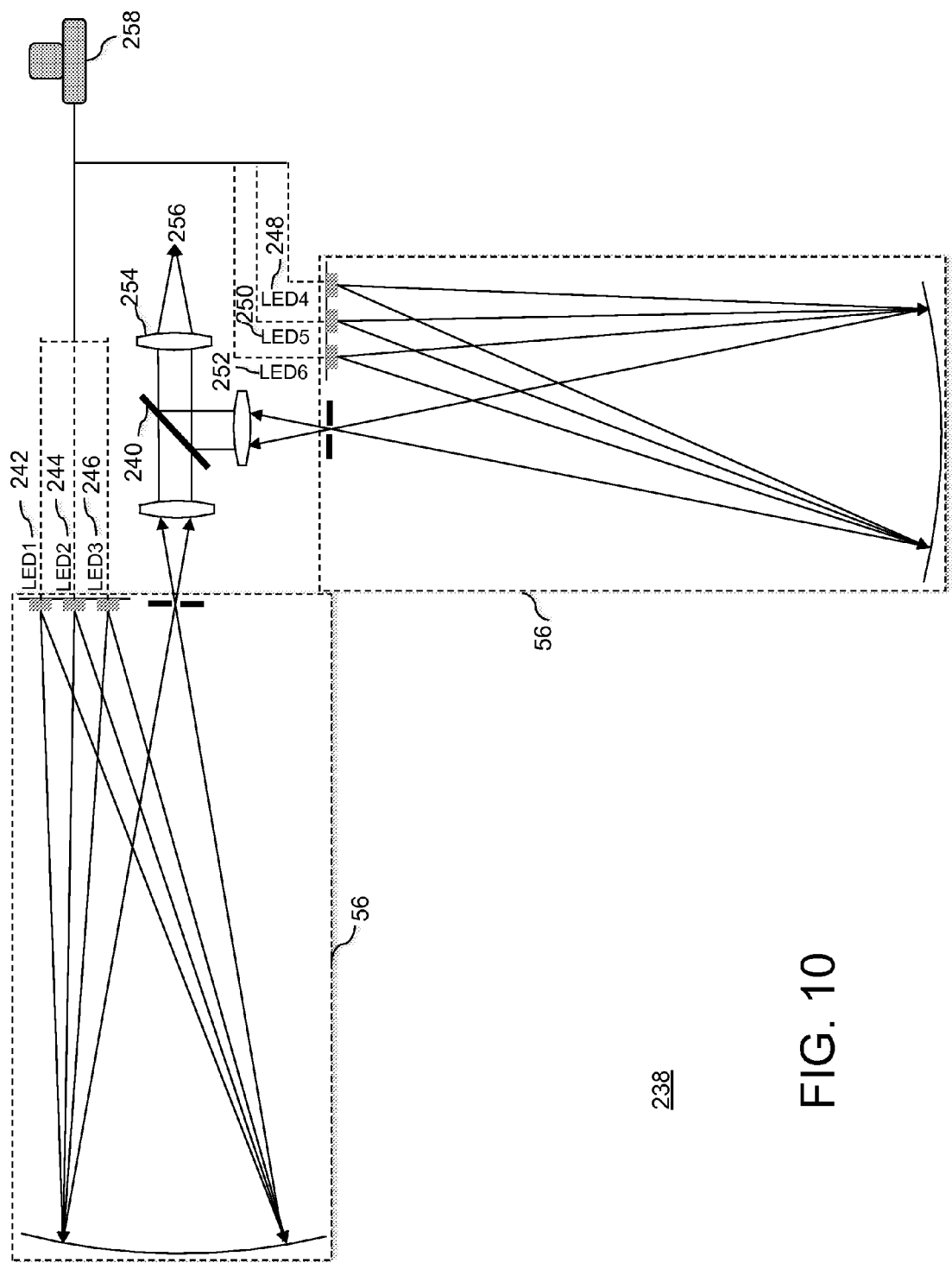
FIG. 10 illustrates a tunable broadband light source system that combines two grating-based devices with a dichroic beamsplitter in accordance with the present invention.

FIG. 10 illustrates a tunable broadband light source system 238 that combines two grating-based devices with a dichroic beamsplitter 240. In this illustration, the two grating-based devices employ two broadband light source devices 56 as described with respect to FIG. 3. The beamsplitter 240 transmits wavelengths from a first light source LED1 242, a second light source LED2 244, a third light source LED3 246 of a first broadband light source device, and reflects wavelengths from a fourth light source LED4 248, a fifth light source LED5 250, a sixth light source LED6 252, which effectively combines wavelengths from all six light sources LED1 242, LED2 244, LED3 246, LED4 248, LED5 250 and LED6 252. The beamsplitter 240 is used to produce a higher channel count in the tunable broadband light source system 238. For example, the first broadband light source device could provide 40 channels, and the second broadband light source device could provide another 40 channels, which provides a total of 80 channels for the tunable light source system 238 with the beamsplitter 240 combining the 40 channels from the first broadband light source device and the 40 channels from the second broadband light source device. The beamsplitter 240 generates a composite light signal (including all wavelengths from the six light sources LED1 242, LED2 244, LED3 246, LED4 248, LED5 250 and LED6 252) via a lens 254 to an output 256, which can be coupled to a variety of elements, such as a fiber, a microscope, or an integrating sphere. The use of the beamsplitter 240 to combine multiple broadband light source devices enables the tunable broadband light source system 238 to cover a wider spectrum range than an individual grating-based system. For example, the tunable broadband light source system 238 can provide a wider spectrum coverage ranging from visible to infrared light, where the first broadband light source device can produce visible wavelengths from blue to red light and the second broadband light source device can produce infrared light from 700 nm to 1,000 nm.

The output spectrum 256 of the multiplexed broadband light source devices can also be tuned by controlling individual LEDs. The six LEDs 242, 244, 246, 248, 250, 252 are controlled by a computing device 258 so the intensity of light from each LED can be set independently.

Figure 11:
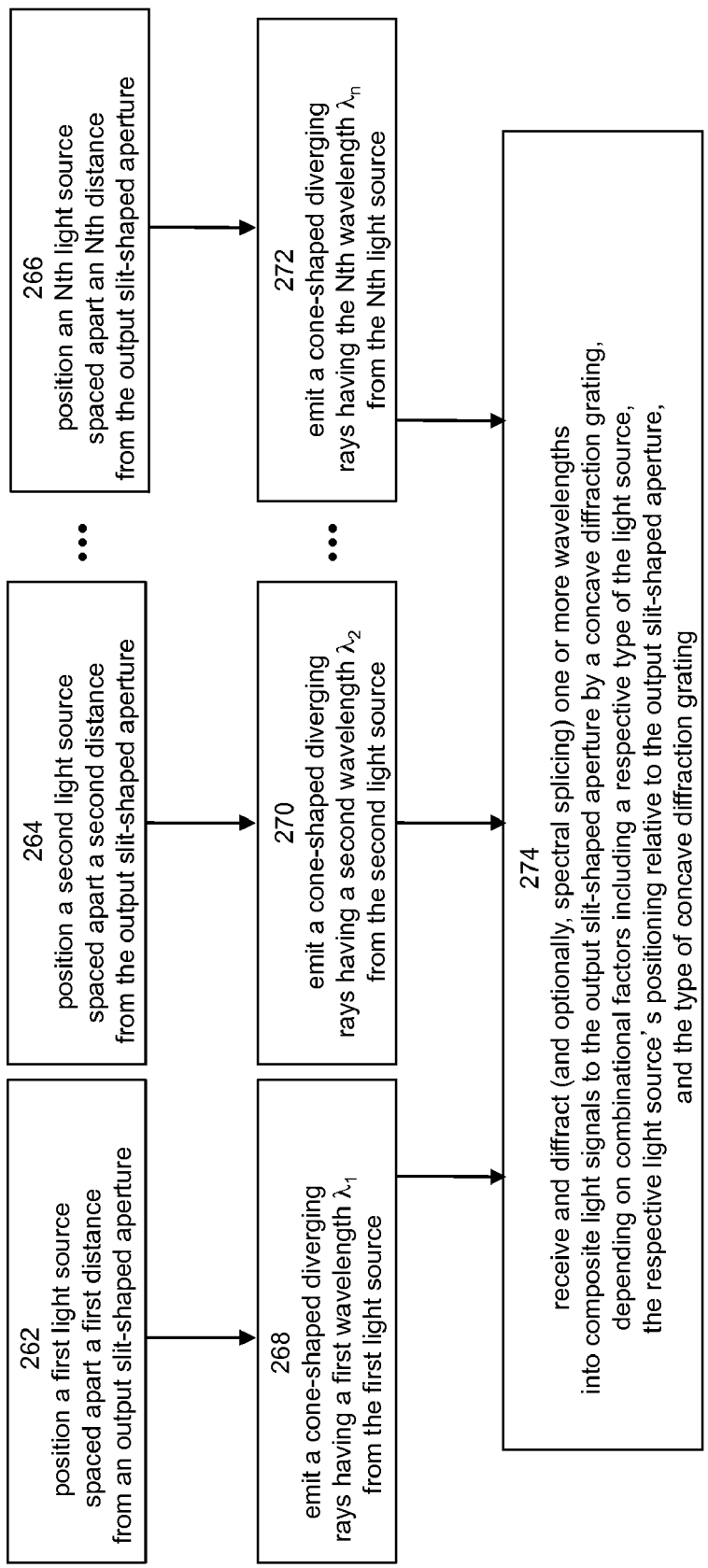
FIG. 11 illustrates a flow diagram of a method for producing a tunable spectrum in a broadband light source device with multiple light sources and a grating in accordance with the present invention.

FIG. 11 illustrates a flow diagram of a method 260 for producing tunable spectrum in the broadband light source device 56 with multiple light sources 62, 64, 66 and the concave diffraction grating 60 as described in FIG. 3. At steps 262, 264, 266, each light source is spaced apart a respective distance from the output slit-shaped aperture 74. At step 262, the first light source 62 is positioned a first distance away from the output slit-shaped aperture 74. At step 264, the second light source 64 is positioned a second distance away from the output slit-shaped aperture 74. At step 266, the Nth light source (which is referred to by the reference numeral 66 in this illustration) is positioned an Nth distance away from the output slit-shaped aperture 74.

At steps 268, 270, 272, each light source emits cone-shaped diverging rays having a respective wavelength. At step 268, the first light source 62 emits the cone-shaped diverging rays 68, 80 having the first wavelength $\lambda_1$. At step 270, the second light source 64 emits the cone-shaped diverging rays 70, 82 having second first wavelength $\lambda_2$. At step 272, the Nth light source 66 emits the cone-shaped diverging rays 72, 84 having the Nth wavelength $\lambda_n$.

At step 274, the concave diffraction grating 58 receives and diffracts the plurality of wavelengths, $\lambda_1, \lambda_2 \ldots \lambda_n$, depending on combinational factors including a respective type of light source, the respective light source's positioning relative to the output slit-shaped aperture, and the type of concave diffraction grating. The concave diffraction grating 58 can also provide an optional spectral slicing feature in spectral slicing and diffracting the plurality of wavelengths.

Although one method for producing a tunable spectrum in the broadband light source device with multiple light sources and the concave diffraction grating is described with respect to FIG. 11, other similar methods are applicable to the embodiments of broadband light source devices and systems as described above.

Various embodiments of a tunable broadband light source device or system as described above are suitable, but not limited, to applications that monitor the output spectrum in real time. In the grating-based embodiments described above, the monitoring function can be realized by placing an additional optical fiber adjacent to the output slit-shaped aperture and connecting the fiber to a spectrometer for monitoring. The spectrometer is able to read out the output spectrum in real time.

High-brightness broadband light sources have many applications, among them, fluorescence excitation, color measurement, solar cell testing, and optical coherence tomography.

The invention has been described with reference to specific exemplary embodiments. Various modifications, adaptations, and changes may be made without departing from the spirit and scope of the invention. For example, although several embodiments of gratings are described in a tunable broadband light source device, including a concave diffraction grating, a transmission diffraction grating, and a plane diffraction grating, other types of gratings or similar optic elements that produce similar functions can be practiced without departing from the spirit of the present invention. Accordingly, the specification and drawings are to be regarded as illustrative of the principles of this invention rather than restrictive. The invention is defined by the following appended claims. While the invention has been described in its currently best-known modes of operation and embodiments, other modes, embodiments and advantages of the present invention will be apparent to those skilled in the art and are contemplated herein.

We claim:

1. A broadband light source device with a tunable spectrum, comprising:
    a first light source for emitting a first light beam having a first wavelength;
    a second light source for emitting a second light beam having a second wavelength;
    an output slit-shaped aperture positioned apart from the first and second light sources, the first light source being spaced apart a first distance from the output slit-shaped aperture, the second light source being spaced apart a second distance from the output slit-shaped aperture; and
    a concave diffraction grating diffracting the first and second wavelengths and combining the first and second wavelengths in parallel at the slit-shaped output aperture to generate a tunable light beam.

2. The broadband light source device of claim 1, further comprising a third light source for emitting a third light beam having a third wavelength, the third light source being spaced apart a third distance from the output slit-shaped aperture, the concave diffraction grating diffracting the first, second, third wavelengths and combining the first, second, third wavelengths in parallel at the slit-shaped output aperture.

3. The broadband light source device of claim 2, wherein the first light source comprises a first light-emitting diode (LED), the second light source comprises a second light-emitting diode, and the third light source comprises a third light-emitting diode.

4. The broadband light source device of claim 3, wherein the first light-emitting diode is selected with a first peak wavelength for matching with the first wavelength, second light-emitting diode is selected with a second peak wavelength for matching with the second wavelength, and the third light-emitting diode is selected with a third peak wavelength for matching with the third wavelength.

5. The broadband light source device of claim 1, wherein the first and second light sources and the output slit-shaped aperture are placed on the same plane.

6. The broadband light source device of claim 1, wherein the first and second light sources are placed on a first plane and the output slit-shaped aperture placed on a second plane.

7. The broadband light source device of claim 6, wherein the first plane comprises an x-z-plane and the second plane comprises a x-z-plane with an offset along the y-axis from the first plane.

8. A method for generating a tunable light beam, comprising:
   modulating a first light beam having a first wavelength from a first light source and a second light beam having a second wavelength from a second light source, the first light source being spaced apart a first distance from an output slit-shaped aperture, the second light source being spaced apart a second distance from the output slit-shaped aperture;
   diffracting the first and second light beams with a diffraction grating means to the output slit-shaped aperture; and
   combining the first and second wavelengths in parallel by a concave diffraction grating at the output slit-shaped aperture to generate a tunable light beam.

9. The method of claim 8, further comprising modulating a third light beam having a third wavelength from a third light source, the third light source being spaced apart a third distance from the output slit-shaped aperture, the concave diffraction grating diffracting the first, second, third wavelengths and combining the first, second, third wavelengths in parallel at the slit-shaped output aperture.

10. The method of claim 9, wherein the first light source comprises a first light-emitting diode, the second light source comprises a second light-emitting diode, and the third light source comprises a third light-emitting diode.

11. The method of claim 10, wherein the first light-emitting diode is selected with a first peak wavelength for matching with the first wavelength, second light-emitting diode is selected with a second peak wavelength for matching with the first wavelength, and the third light-emitting diode is selected with a third peak wavelength for matching with the third wavelength.

12. A tunable broadband light source device with a wavelength selectivity, comprising:
   an output slit-shaped aperture;
   a first light source for emitting a first light beam having a first wavelength, the first light source being spaced apart a first distance from the output slit-shaped aperture;
   a second light source for emitting a second light beam having a second wavelength, the second light source being spaced apart a second distance from the output slit-shaped aperture; and
   a concave diffraction grating having for spectral slicing first and second wavelengths, the concave diffraction grating diffracting the first wavelength to the output slit-shaped aperture if the combination of the first wavelength of the first light source and the concave diffracting grating correspond with the first distance to transmit the first light wavelength to the output slit-shaped aperture, the concave diffraction grating diffracting the second wavelength to the output slit-shaped aperture if the combination of the second wavelength of the second light source and the concave diffracting grating correspond with the second distance to transmit the second light wavelength to the output slit-shaped aperture.

13. The tunable broadband light source device of claim 12, wherein the first light source does not transmit the first light wavelength to and through the output slit-shaped aperture if the combination of the first wavelength of the first light source and the concave diffracting grating does not correspond with the first distance.

14. The tunable broadband light source device of claim 12, wherein the second light source does not transmit the second light wavelength to and through the output slit-shaped aperture if the combination of the second wavelength of the second light source and the concave diffracting grating does not correspond with the second distance.

15. A method for wavelength selectivity, comprising:
   modulating a first light beam having a first wavelength from a first light source and a second light beam having a second wavelength from a second light source, the first light source being spaced apart a first distance from an output slit-shaped aperture, the second light source being spaced apart a second distance from the output slit-shaped aperture; and
   diffracting by a concave diffracting grating of the first beam having the first wavelength and the second light beam having the second wavelength;
   wherein the concave diffracting grating spectral slicing first and second wavelengths, the concave diffracting grating diffracting the first wavelength to the output slit-shaped aperture if the combination of the first wavelength of the first light source and the concave diffracting grating correspond with the first distance to transmit the first light wavelength to the output slit-shaped aperture, the concave diffracting grating diffracting the second wavelength to the output slit-shaped aperture if the combination of the second wavelength of the second light source and the concave diffracting grating correspond with the second distance to transmit the second light wavelength to the output slit-shaped aperture.

16. The method of claim 15, wherein the first light source does not transmit the first light wavelength to and through the output slit-shaped aperture if the combination of the first wavelength of the first light source and the concave diffracting grating does not correspond with the first distance.

17. The method of claim 15, wherein the second light source does not transmit the second light wavelength to and through the output slit-shaped aperture if the combination of the second wavelength of the second light source and the concave diffracting grating does not correspond with the second distance.

18. A tunable broadband light source device with a wavelength slicing for higher spectral resolution, comprising:
   an output slit-shaped aperture;
   a first light source for emitting a first light beam having a first wavelength with a first bandwidth, the first light source being spaced apart a first distance from the output slit-shaped aperture; and
   a concave diffraction grating diffracting the first wavelength with the first bandwidth to the output slit-shaped aperture, the slit-shaped aperture allowing a second bandwidth to pass through while blocking the first bandwidth, the second bandwidth being a narrower band and a subset of the first bandwidth of the first wavelength.

19. The tunable broadband light source device of claim 18, wherein the combination of the concave diffraction grating and a predetermined size of the slit-shaped aperture allows the second bandwidth to pass through the slit-shaped aperture.

20. The tunable broadband light source device of claim 18, further comprising a second light source for emitting a second light beam having a second wavelength with a third bandwidth, the second light source being spaced apart a second distance from the output slit-shaped aperture, the concave diffraction grating diffracting the second wavelength with the third bandwidth to the output slit-shaped aperture, the slit-shaped aperture allowing a fourth bandwidth to pass through while block the third bandwidth, the fourth bandwidth being a narrower band and a subset of the third bandwidth of the second wavelength.

21. A method for wavelength slicing, comprising:
modulating a first light beam having a first wavelength with a first bandwidth from the first light source, the first light source being spaced apart a first distance from an output slit-shaped aperture; and
a concave diffraction grating diffracting the first wavelength with the first bandwidth to the output slit-shaped aperture, the slit-shaped aperture allowing a second bandwidth pass through while blocking the first bandwidth, the second bandwidth being a narrower band and a subset of the first bandwidth of the first wavelength.

22. The method of claim 21, wherein the combination of the concave diffraction grating and a predetermined size of the slit-shaped aperture allows the second bandwidth to pass through the slit-shaped aperture.

23. The method of claim 21, further comprising:
modulating a second light beam having a second wavelength with a third bandwidth from the second light source, the second light source being spaced apart a second distance from an output slit-shaped aperture; and
the concave diffraction grating diffracting the second wavelength with the third bandwidth to the output slit-shaped aperture, the slit-shaped aperture allowing a fourth bandwidth pass through while blocking the third bandwidth, the fourth bandwidth being a narrower band and a subset of the third bandwidth of the second wavelength.

24. A tunable broadband light source device, comprising:
a plurality of light sources for emitting a plurality of cone-shaped light beams having a plurality of wavelengths;
a first lens for collimating the plurality of light beams to generate a plurality of collimated beams;
a transmission diffraction grating for combining and diffracting the plurality of collimated beams into diffracted beams; and
a second lens for refocusing the diffracted beams into a slit-shaped aperture.

25. The device of claim 24, wherein the plurality of light sources are positioned in a first direction away from the first lens, and the transmission diffraction grating is positioned in a second direction opposite of the first direction from the first lens.

26. The device of claim 24, wherein the first lens comprises one or more lenses.

27. The device of claim 24, wherein the second lens comprises one or more lenses.

28. A method for generating a tunable spectrum, comprising:
emitting a plurality of cone-shaped light beams having a plurality of wavelengths from a plurality of light sources;
collimating the plurality of light beams by a first lens to generate a plurality of collimated beams;
combining and diffracting the plurality of collimated beams into diffracted beams by a transmission diffraction grating; and
focusing the diffracted beams into a slit-shaped aperture by a second lens.

29. The method of claim 28, wherein the plurality of light sources are positioned in a first direction away from the first lens, and the transmission diffraction grating is positioned in a second direction opposite of the first direction from the first lens.

30. A tunable broadband light source device, comprising:
a fiber array having a plurality of fibers;
a plurality of light sources for emitting a plurality of cone-shaped light beams having a plurality of wavelengths, the plurality of light sources coupled to a respective one of the plurality of fibers;
a first lens for collimating the plurality of light beams to generate a plurality of collimated beams;
a transmission diffraction grating for combining and diffracting the plurality of collimated beams into diffracted beams; and
a second lens for refocusing the diffracted beams into a slit-shaped aperture.

31. The device of claim 30, wherein: the plurality of light sources comprises a first light source, the first light source emitting a first light beam having a first wavelength with a first bandwidth; and the transmission diffraction grating diffracting the first wavelength with the first bandwidth to the output slit-shaped aperture, the slit-shaped aperture allowing the second bandwidth pass through while blocking the first bandwidth, the second bandwidth being a narrower band and a subset of the first bandwidth of the first wavelength.

32. The broadband light source device of claim 31, wherein the combination of the transmission diffraction grating and a predetermined size of the slit-shaped aperture allows the second bandwidth to pass through the slit-shaped aperture.

33. The broadband light source device of claim 30, wherein the plurality of light sources comprises a first light source, the first light source being individually replaceable by a light source for coupling to a corresponding fiber in the fiber array.

34. A tunable broadband light source device, comprising:
a compound fiber array having a plurality of fiber bundles;
first one or more light sources for emitting one or more cone-shaped light beams having a first wavelength, the first one or more light sources coupled to a first fiber bundle in the plurality of fiber bundles;
a first lens for collimating the first plurality of light beams to generate a plurality of collimated beams;
a transmission diffraction grating for combining and diffracting the first plurality of collimated beams into diffracted beams having the first wavelength; and
a second lens for refocusing the diffracted beams having the first wavelength into a slit-shaped aperture.

35. The device of claim 34, further comprising:
a second one or more light sources for emitting one or more cone-shaped light beams having a second wavelength, the second plurality of light sources coupled to a second fiber bundle in the plurality of fiber bundles;
a first lens for collimating the second plurality of light beams to generate a plurality of collimated beams;
a transmission diffraction grating for combining and diffracting the second plurality of collimated beams into diffracted beams having the second wavelength; and
a second lens for refocusing the diffracted beams having the second wavelength into a slit-shaped aperture.

36. The device of claim 34, wherein each fiber bundle in the plurality of fiber bundles is arranged in a circular shape at one end and a line or rectangular shape at the other end.

37. A tunable broadband light source system, comprising:
a first broadband light source device, comprising:
a first slit-shaped aperture;
a first plurality of light sources for emitting a first plurality of light beams having a first plurality of wavelengths, each of the first plurality of light sources being spaced part respectively from the first slit-shaped aperture; and a first concave diffraction grating diffracting the first plurality of wavelengths to the output slit-shaped aperture if the combination of each respective wavelength of a corresponding light source and the concave diffracting grating correspond with a respective distance to transmit the respective light wavelength to the first slit-shaped aperture;

a second broadband light source device, comprising:

a second slit-shaped aperture;

a second plurality of light sources for emitting a second plurality of light beams having a second plurality of wavelengths, each of the second plurality of light sources being spaced part respectively from the second slit-shaped aperture; and a second concave diffraction grating diffracting the second plurality of wavelengths to the output slit-shaped aperture if the combination of each respective wavelength of a corresponding light source and the concave diffracting grating correspond with a respective distance to transmit the respective light wavelength to the second slit-shaped aperture;

a beamsplitter for combining the first and second plurality of wavelengths by transmitting the first plurality of wavelengths and reflecting the second plurality of wavelengths.

38. The system of claim 37, wherein the first plurality of wavelengths comprises visible light.

39. The system of claim 37, wherein the second plurality of wavelengths comprises infrared light.

40. The system of claim 37, further comprising a computing device coupled to the first and second plurality of light sources for individual tuning each light source.

* * * * *